(12) United States Patent
Wilkinson et al.

(10) Patent No.: US 6,350,538 B1
(45) Date of Patent: Feb. 26, 2002

(54) FUEL CELL WITH FLUID DISTRIBUTION LAYER HAVING INTERGRAL SEALING CAPABILITY

(75) Inventors: David P. Wilkinson, North Vancouver; Stephen A. Campbell, Maple Ridge; Juergen Stumper, Vancouver, all of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/384,531

(22) Filed: Aug. 27, 1999

Related U.S. Application Data

(63) Continuation-in-part of application No. 08/846,653, filed on May 1, 1997, now Pat. No. 5,976,726.

(51) Int. Cl.[7] .............................. H01M 8/04; H01M 8/10
(52) U.S. Cl. ........................................... 429/32; 429/39
(58) Field of Search .............................. 429/32, 35, 38, 429/39

(56) References Cited

U.S. PATENT DOCUMENTS

| 4,555,324 A | 11/1985 | Ueno et al. ................. 204/284 |
| 5,176,966 A | 1/1993 | Epp et al. ...................... 429/26 |

(List continued on next page.)

FOREIGN PATENT DOCUMENTS

| DE | 4206490 | 9/1993 |
| EP | 0 174 762 | 3/1986 |
| EP | 0629015 | 12/1994 |
| EP | 0690519 | 1/1996 |
| EP | 0774794 | 5/1997 |
| JP | 05-101837 | 4/1993 |
| JP | 07-296818 | 11/1995 |
| JP | 08-124583 | 5/1996 |
| JP | 08-148170 | 6/1996 |
| WO | WO 94 09519 | 4/1994 |
| WO | WO 95 16287 | 6/1995 |
| WO | WO 97 08766 | 3/1997 |
| WO | WO 97 13287 | 4/1997 |

OTHER PUBLICATIONS

Zawodzinski et al. "Stainless Steel Mesh Flow–Fields For Polymer Electrolyte Fuel Cells", Program and Abstracts, 1996 Fuel Cell Seminar, Orlando, Florida (11/96).

"Fine Expanded Metals" product brochure Exmet Corporation (Date Unknown).

"Decorative Expanded Metals" product brochure Exmet Corporation (Date Unknown).

*Primary Examiner*—Stephen Kalafut
(74) *Attorney, Agent, or Firm*—McAndrews, Held & Malloy, Ltd.

(57) ABSTRACT

A fuel cell comprises a pair of separator plates and a pair of fluid distribution layers interposed between the separator plates. At least one of the fluid distribution layers comprises a sealing region and an electrically conductive, fluid permeable active region, and a thermoplastic polymeric material extending into each of the sealing region and the active region. An ion exchange membrane is interposed between at least a portion of the fluid distribution layers, and a quantity of electrocatalyst is interposed between at least a portion of each of the fluid distribution layers and at least a portion of the membrane, thereby defining the active region. Melt-bonding the thermoplastic material in the sealing region renders the at least one fluid distribution layer substantially fluid impermeable in a direction parallel to the major planar surfaces. This approach reduces or eliminates the need for separate gaskets or sealing components and integrates several functions, such as sealing, fluid distribution, and current collection in a single layer.

28 Claims, 3 Drawing Sheets

U.S. PATENT DOCUMENTS

| | | | |
|---|---|---|---|
| 5,187,025 A | 2/1993 | Kelland et al. | 429/33 |
| 5,219,674 A | 6/1993 | Singelyn et al. | 429/36 |
| 5,264,299 A | 11/1993 | Krasij et al. | 429/30 |
| 5,284,718 A | 2/1994 | Chow et al. | 429/26 |
| 5,350,643 A | 9/1994 | Imahashi et al. | 429/33 |
| 5,480,735 A | 1/1996 | Landsman et al. | 429/13 |
| 5,523,175 A | 6/1996 | Beal et al. | 429/30 |
| 5,565,072 A | 10/1996 | Faita et al. | 204/256 |
| 5,837,395 A | 11/1998 | Breault et al. | 429/35 |
| 5,976,726 A * | 11/1999 | Wilkinson et al. | 429/35 |

* cited by examiner

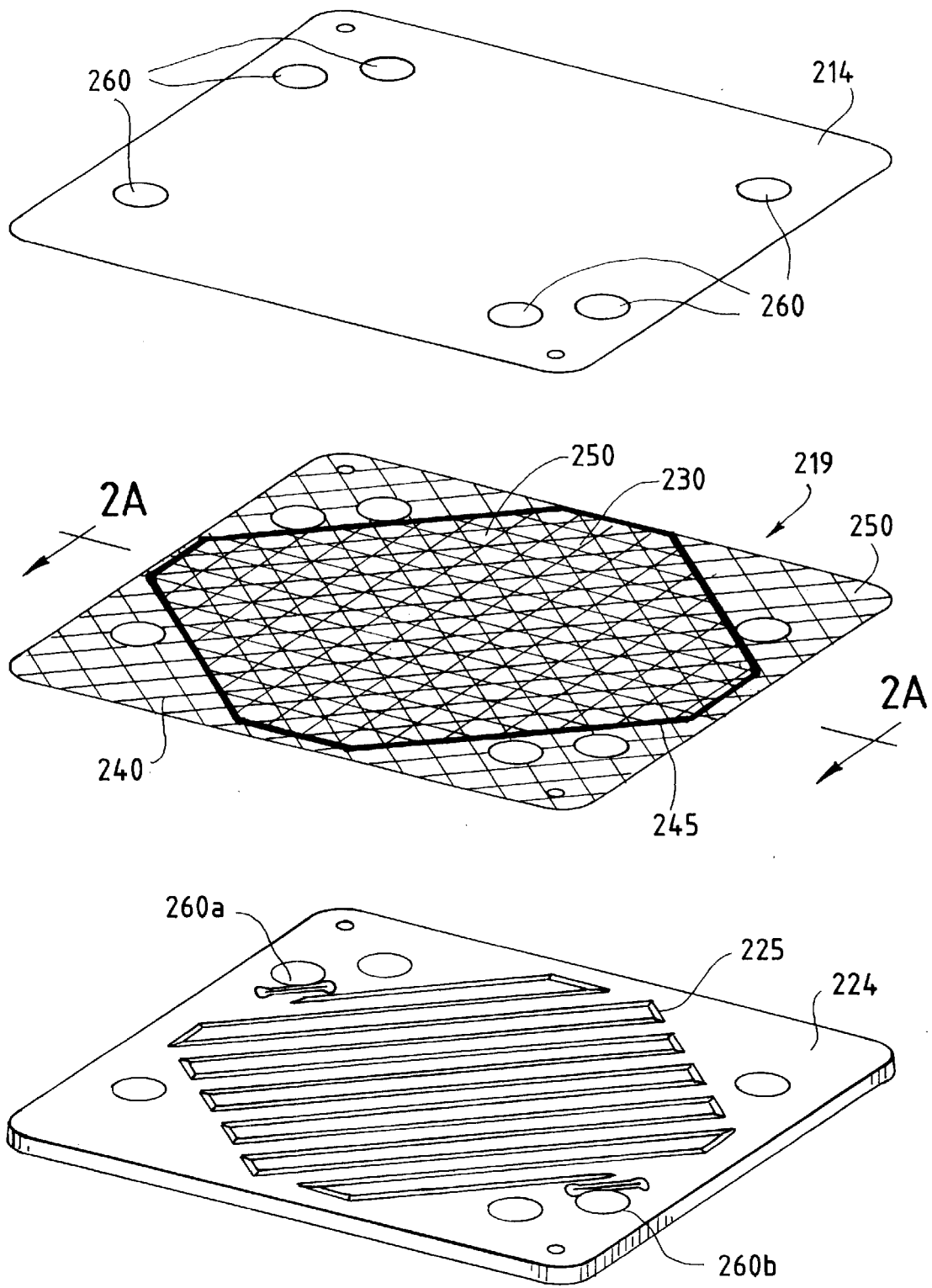

FUEL CELL WITH FLUID DISTRIBUTION LAYER HAVING INTERGRAL SEALING CAPABILITY

CROSS-REFERENCE TO RELATED APPLICATION

This application is a continuation-in-part of U.S. patent application Ser. No. 08/846,653, filed on May 1, 1997, also entitled "Electrochemical Cell With Fluid Distribution Layer Having Integral Sealing Capability" now U.S. Pat. No. 5,976,726. The '653 application is incorporated herein by reference in its entirety.

FIELD OF THE INVENTION

This invention relates to a fuel cell with a fluid distribution layer having integral sealing capability.

BACKGROUND OF THE INVENTION

Electrochemical fuel cells convert fuel and oxidant to electricity and reaction product. Solid polymer fuel cells generally employ a membrane electrode assembly ("MEA") comprising a solid polymer electrolyte or ion exchange membrane disposed between two fluid distribution (electrode substrate) layers formed of electrically conductive sheet material. The fluid distribution layer has a porous structure across at least a portion of its surface area, which renders it permeable to fluid reactants and products in the fuel cell. The electrochemically active region of the MEA also includes a quantity of electrocatalyst, typically disposed in a layer at each membrane/fluid distribution layer interface, to induce the desired electrochemical reaction in the fuel cell. The electrodes thus formed are electrically coupled to provide a path for conducting electrons between the electrodes through an external load.

At the anode, the fluid fuel stream moves through the porous portion of the anode fluid distribution layer and is oxidized at the anode electrocatalyst. At the cathode, the fluid oxidant stream moves through the porous portion of the cathode fluid distribution layer and is reduced at the cathode electrocatalyst.

In fuel cells employing hydrogen as the fuel and oxygen as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

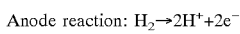

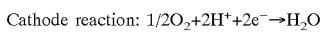

In fuel cells employing methanol as the fuel supplied to the anode (so-called "direct methanol" fuel cells) and an oxygen-containing stream, such as air (or substantially pure oxygen) as the oxidant supplied to the cathode, the methanol is oxidized at the anode to produce protons and carbon dioxide. Typically, the methanol is supplied to the anode as an aqueous solution or as a vapor. The protons migrate through the ion exchange membrane from the anode to the cathode, and at the cathode electrocatalyst layer, oxygen reacts with the protons to form water. The anode and cathode reactions in this type of direct methanol fuel cell are shown in the following equations:

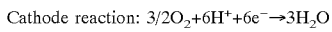

In fuel cells, the MEA is typically interposed between two separator plates or fluid flow field plates (anode and cathode plates). The plates typically act as current collectors, provide support to the MEA, and prevent mixing of the fuel and oxidant streams in adjacent fuel cells, thus, they are typically electrically conductive and substantially fluid impermeable. Fluid flow field plates typically have channels, grooves or passages formed therein to provide means for access of the fuel and oxidant streams to the surfaces of the porous anode and cathode layers, respectively.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell, hence the plates are sometimes referred to as bipolar plates. Such a series connected multiple fuel cell arrangement is referred to as a fuel cell stack. The stack typically includes manifolds and inlet ports for directing the fuel and the oxidant to the anode and cathode fluid distribution layers, respectively. The stack also usually includes a manifold and inlet port for directing the coolant fluid to interior channels within the stack. The stack also generally includes exhaust manifolds and outlet ports for expelling the unreacted fuel and oxidant streams, as well as an exhaust manifold and outlet port for the coolant fluid exiting the stack.

The fluid distribution layer in fuel cells has several functions, typically including:

(1) to provide access of the fluid reactants to the electrocatalyst;

(2) to provide a pathway for removal of fluid reaction product (for example, water in hydrogen/oxygen fuel cells and water and carbon monoxide in direct methanol fuel cells);

(3) to serve as an electronic conductor between the electrocatalyst layer and the adjacent separator or flow field plate;

(4) to serve as a thermal conductor between the electrocatalyst layer and the adjacent separator or flow field plate;

(5) to provide mechanical support for the electrocatalyst layer;

(6) to provide mechanical support and dimensional stability for the ion exchange membrane.

The fluid distribution layer is electrically conductive across at least a portion of its surface area to provide an electrically conductive path between the electrocatalyst reactive sites and the current collectors. Materials that have been employed in fluid distribution layers in solid polymer fuel cells include:

(a) carbon fiber paper;

(b) woven and non-woven carbon fabric—optionally filled with electrically conductive filler such as carbon particles and a binder;

(c) metal mesh or gauze—optionally filled with electrically conductive filler such as carbon particles and a binder;

(d) polymeric mesh or gauze, such as polytetrafluoroethylene mesh, rendered electrically conductive, for example, by filling with electrically conductive filler such as carbon particles and a binder.

(e) microporous polymeric film, such as microporous polytetrafluoroethylene, rendered electrically conductive, for example, by filling with electrically conductive filler such as carbon particles and a binder.

Thus, fluid distribution layers typically comprise preformed sheet materials which are electrically conductive and fluid permeable in the region corresponding to the electrochemically active region of the fuel cell.

Conventional methods of sealing around MEAs within fuel cells include framing the MEA with a resilient fluid impermeable gasket, placing preformed seal assemblies in channels in the fluid distribution layer and/or separator plate, or molding seal assemblies within the fluid distribution layer or separator plate, circumscribing the electrochemical active region and any fluid manifold openings. Examples of such conventional methods are disclosed in U.S. Pat. Nos. 5,176,966 and 5,284,718. Disadvantages of these conventional approaches include difficulty in assembling the sealing mechanism, difficulty in supporting narrow seal assemblies within the fluid distribution layer, localized and uneven mechanical stresses applied to the membrane and seal assemblies, and seal deformation and degradation over the lifetime of the fuel cell stack.

Such gaskets and seals, which are separate components introduced in additional processing or assembly steps, add complexity and expense to the manufacture of fuel cell stacks.

SUMMARY OF THE INVENTION

The invention includes a fuel cell with a fluid distribution layer having integral sealing capability and a method for effecting sealing. The fuel cell comprises:

(a) a pair of substantially fluid impermeable separator plates;

(b) a pair of fluid distribution layers interposed between the separator plates, each of the fluid distribution layers having two major planar surfaces, at least one of the fluid distribution layers comprising a sealing region and an electrically conductive, fluid permeable active region, the at least one fluid distribution layer comprising thermoplastic polymeric material extending into each of the sealing region and the active region;

(c) an ion exchange membrane interposed between at least a portion of the fluid distribution layers;

(d) a quantity of electrocatalyst interposed between at least a portion of each of the fluid distribution layers and at least a portion of the membrane, thereby defining the active region.

The thermoplastic polymeric material is melt-bonded in the sealing region, thereby rendering the at least one fluid distribution layer substantially fluid impermeable in a direction parallel to the major planar surfaces, in the sealing region. Thus, the thermoplastic polymeric material included in the at least one fluid distribution layer has intrinsic sealing capability.

The thermoplastic polymeric material included in the at least one fluid distribution layer may be melt-bonded to the adjacent separator plate.

In a preferred fuel cell, each of the fluid distribution layers comprises a sealing region and an electrically conductive, fluid permeable active region, and each of the fluid distribution layers comprises thermoplastic polymeric material extending into each of the sealing region and the active region.

In preferred embodiments the membrane superposes at least a portion of the sealing region. Advantageously, therefore, the thermoplastic polymeric material in the sealing region of the fluid distribution layer may be melt-bonded to the ion exchange membrane.

In preferred embodiments, the thermoplastic polymeric material comprises a polyolefin material, such as, for example polyethylene or polypropylene.

The fluid distribution layer may be electrically insulating in the sealing region.

The thermoplastic polymeric material may be a preformed sheet. In a first embodiment of a fuel cell, the preformed sheet is a mesh, which may optionally contain an electrically conductive filler at least in the active region. The term mesh as used herein includes woven meshes and expanded mesh materials. In a second embodiment of a fuel cell, the preformed sheet is a microporous sheet material.

Alternatively, the thermoplastic polymeric material (before melt-bonding) may comprise particulates dispersed throughout the fluid distribution layer. In some embodiments, the particulates may be or include fibers.

In any of the embodiments described above, at least one of the fluid distribution layers may comprise at least one channel, for directing a fluid reactant stream, formed in at least one of the major planar surfaces thereof. The at least one channel preferably traverses the active region.

In any of the embodiments described above, at least one of the separator layers may comprise at least one channel formed in a major surface thereof facing a fluid distribution layer, for directing a fluid reactant stream in contact with the layer.

In any of the embodiments described above, a fluid distribution layer may comprise one or more layers of material.

In any of the embodiments described above, a fluid distribution layer may comprise an electrically conductive filler in the active region. Preferred electrically conductive fillers comprise a binder and electrically conductive particles, such as, carbon particles and/or boron carbide particles. The electrically conductive filler may comprise a catalyst and/or an ionomer.

In any of the above embodiments, the sealing region may have at least one fluid manifold opening formed therein.

BRIEF DESCRIPTION OF THE DRAWINGS

FIG. 2B is an exploded isometric view of a portion of the fuel cell of FIG. 2A.

DETAILED DESCRIPTION OF THE PREFERRED EMBODIMENTS

Figure 1:
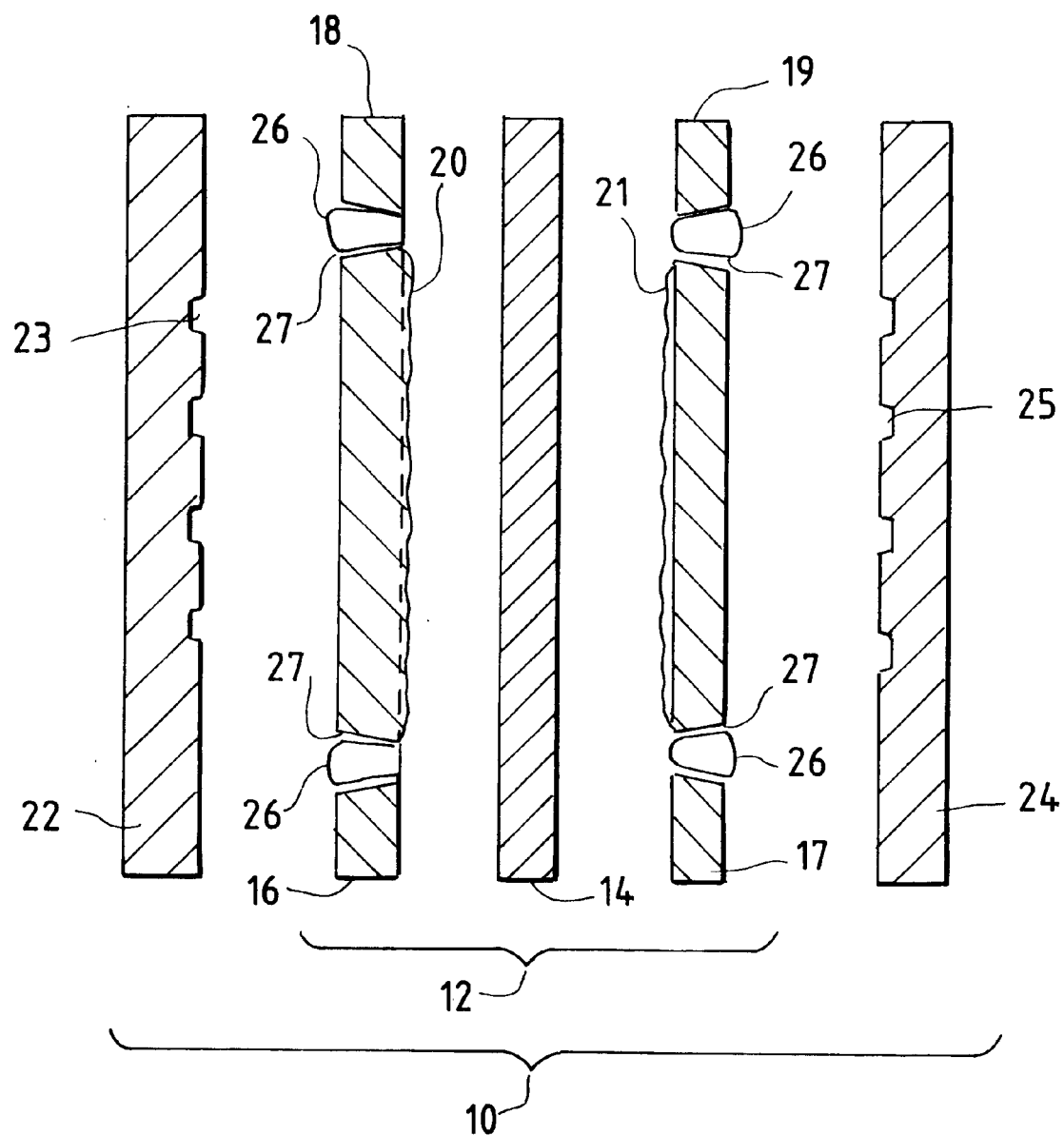
FIG. 1 is an exploded sectional view of a conventional (prior art) solid polymer fuel cell showing an MEA interposed between two flow field plates.

FIG. 1 illustrates a typical (prior art) solid polymer fuel cell 10. Fuel cell 10 includes an MEA 12 including an ion exchange membrane 14 interposed between two electrodes, namely, an anode 16 and a cathode 17. Anode 16 includes a porous electrically conductive fluid distribution layer 18. A thin layer of electrocatalyst 20 is disposed at the interface with the membrane 14, thereby defining an electrochemically active region of fluid distribution layer 18. Cathode 17 includes a porous electrically conductive fluid distribution layer 19. A thin layer of electrocatalyst 21 is disposed at the interface with the membrane 14, thereby defining an electrochemically active region of fluid distribution layer 19. The MEA is interposed between anode flow field plate 22 and cathode flow field plate 24. Anode flow field plate 22 has at least one fuel flow channel 23 formed in its surface facing the anode fluid distribution layer 18. Cathode flow field plate 24 has at least one oxidant flow channel 25 formed in its surface facing the cathode fluid distribution layer 19. When assembled against the cooperating surfaces of the fluid distribution layers 18 and 19, channels 23 and 25 form reactant flow field passages for the fuel and oxidant, respectively. Membrane electrode assembly 12 also includes preformed gaskets 26 placed within channels 27, which extend through the thickness of the fluid distribution layers 18 and 19. When the fuel cell 10 is assembled and compressed, by urging plates 22 and 24 towards each other, the gaskets 26 cooperate with the plates 22, 24 and the membrane 14 to form a seal circumscribing the electrochemically active region of each fluid distribution layer 18, 19.

Figure 2A:
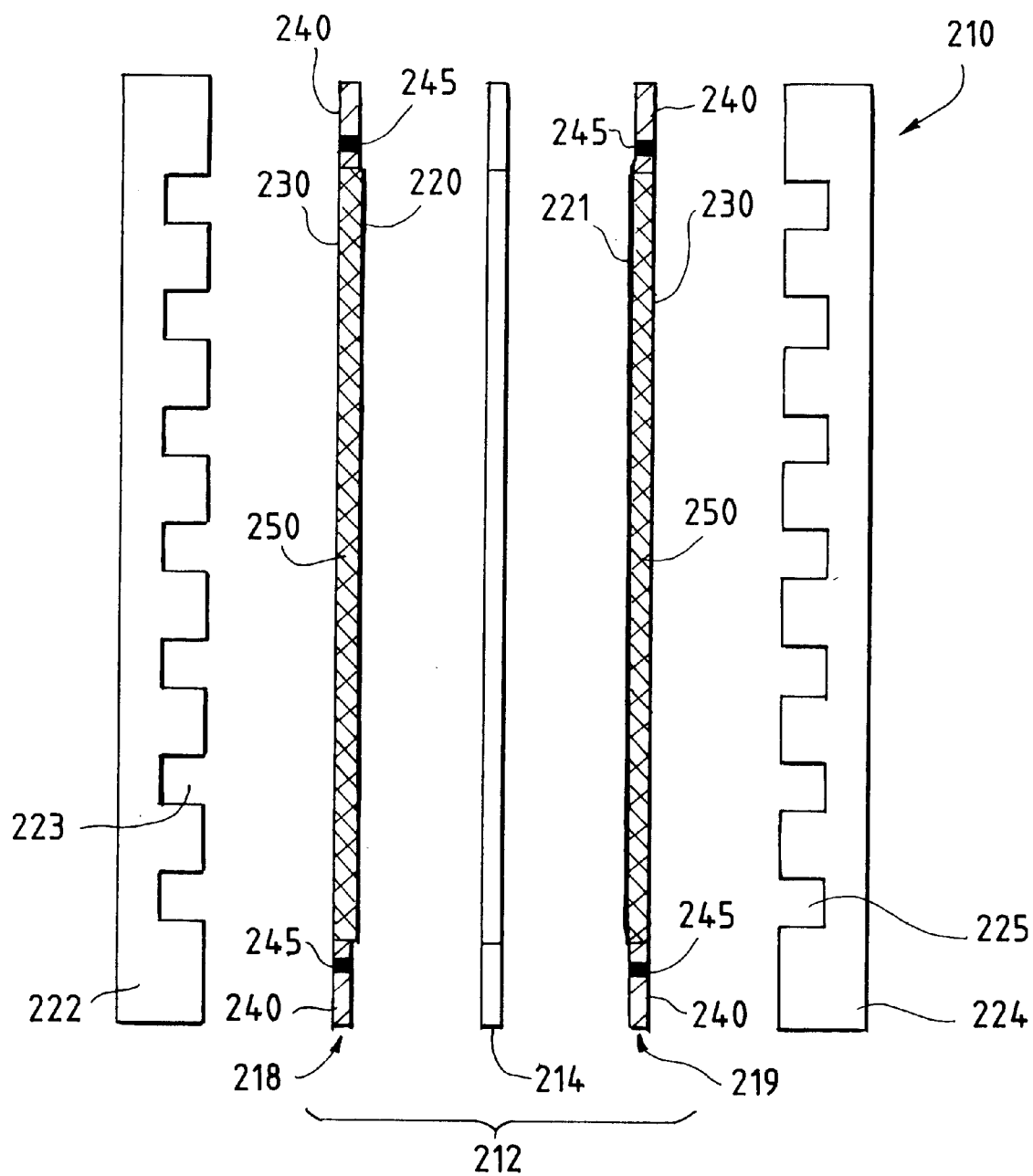
FIG. 2A is an exploded sectional view, in the direction of arrows A—A in FIG. 2B, of a fuel cell that includes a pair of fluid flow field plates and a pair of fluid distribution layers with integral sealing capability. The fluid distribution layers include a thermoplastic polymeric mesh sheet material that has been melt-bonded in the sealing region.

FIG. 2A is an exploded sectional view of a fuel cell 210, a portion of which is shown in FIG. 2B in an exploded isometric view. Fuel cell 210 includes a membrane electrode assembly 212, which includes an ion exchange membrane 214 interposed between a pair of fluid distribution layers 218 and 219. A quantity of electrocatalyst is disposed in a layer 220, 221 at the interface between each fluid distribution layer 218, 219 and membrane 214 in the electrochemically active region 230 of the fluid distribution layers 218, 219. The catalyst may be applied to the membrane or to the fluid distribution layer. The MEA 212 is interposed between a pair of flow field plates 222 and 224. Each plate 222, 224 has an open-faced channel 223, 225 formed in its surface facing the corresponding fluid distribution layer 218, 219, respectively, and traversing a portion of each plate which superposes the electrochemically active region 230. When assembled against the cooperating surfaces of the fluid distribution layers 218 and 219, channels 223 and 225 form reactant flow field passages for the fuel and oxidant, respectively.

Fluid distribution layers 218, 219 each have a sealing region 240. In the illustrated embodiment, ion exchange membrane 214 superposes sealing region 240 and may be melt-bonded thereto.

In the electrochemically active region 230, the fluid distribution layers 218, 219 are electrically conductive and fluid permeable, to permit the passage of reactant fluid between the two major planar surfaces thereof to access the electrocatalyst layer 220, 221 respectively. In the embodiment illustrated in FIGS. 2A and 2B, fluid distribution layers include an electrically insulating preformed thermoplastic polymeric mesh sheet material 250 extending into each of the active and sealing regions 230, 240, respectively. The fluid distribution layer is rendered electrically conductive in the active region 230, for example, it may contain an electrically conductive filler, at least in the region 230. Polymeric mesh sheet material 250 is melt-bonded at locations 245 in the sealing region 240 thereby rendering the fluid distribution layers substantially fluid impermeable in a direction parallel to their major planar surfaces. Further, polymeric mesh sheet material 250 is melt-bonded to ion exchange membrane 214 at locations 245 thereby also effecting a seal between fluid distribution layers 218, 219 and membrane 214. The melt-bonding within mesh sheet material 250 at locations 245 and the melt-bonding of mesh sheet material 250 to membrane 214 may desirably be accomplished in one step. A suitable melt-bond may be obtained using a conventional technique appropriate for the joining of thermoplastics, such as heat bonding or ultrasonic welding. Where appropriate, solvent bonding may also be employed (e.g., where a solvent is used to dissolve the polymeric sheet material after which the solvent is removed, leaving a melt-bonded polymeric seal). Seals between the melt-bonded membrane electrode assembly 212 and plates 222, 224 are effected by compression of the fluid distribution layers 218, 219 in the sealing region 240 between plates 222, 224. Thus, complete sealing around the periphery of the active region 230, is accomplished partly by melt-bonding of thermoplastics and partly by compression. Suitable mesh materials include expanded polyolefin materials, such as expanded polypropylene or polyethylene.

As shown in FIG. 2B, each of membrane 214, fluid distribution layer 219, reactant flow field plate 224, has a plurality of openings 260 formed therein, which align when assembled to form manifolds for directing inlet and outlet fluid streams through fuel cell 210. For example, oxidant fluid flow field channel 225 extends between oxidant inlet manifold opening 260a and oxidant outlet manifold 260b formed in plate 224. The fluid manifold openings 260 in fluid distribution layers 218, 219 are formed in sealing region 240. Openings, 260, need not necessarily be formed in the mesh material of the fluid distribution layer, as the fluid passing through the manifold can generally readily pass through the mesh material. Melt-bonded locations 245 appear between active region 230 and openings 260.

In FIG. 2A, other polymeric preformed sheets (e.g., suitable microporous films) may be employed in the fluid distribution layers 218, 219 instead of the expanded polymeric mesh sheet material 250.

Further, in principle, thermoplastic particulate filled fluid distribution layers might also be sealed in this way. Thus, thermoplastic polymeric particulates (e.g., plastic fibers) dispersed throughout the fluid distribution layer may be employed instead of a mesh.

In the embodiment of FIG. 2A, melt-bonding of the fluid distribution layers to the membrane is preferred since this provides a seal at the fluid distribution layer/membrane interface and may result in simpler overall manufacture of an MEA. However, this interfacial seal may instead be effected by compression where desired (for instance if the membrane and thermoplastic polymeric material in the fluid distribution layer are not suitably compatible).

A wide variety of fabrication processes may be used to manufacture and assemble fuel cells of the present design. The design is believed to be suited for high throughput manufacturing processes, such as the reel-to-reel type process disclosed in the aforementioned U.S. patent application Ser. No. 08/846,653 incorporated herein by reference. Such a reel-to-reel process may consolidate several webs consisting of the fluid distribution layers, a catalyzed membrane, and a separator layer. The consolidation step could include a thermal lamination (thereby effecting the melt-bonding between the fluid distribution layers and the membrane) and a pressure bonding process.

The practical advantages of the present fuel cell with a fluid distribution layer having integral sealing capability is the combination of the sealing and fluid distribution functions into one fluid distribution layer, thereby reducing cost, simplifying the components, and improving their reliability. This approach reduces or eliminates the need for separate sealing components in a fuel cell assembly.

In all of the above embodiments, the fuel cell may include additional layers of materials interposed between those shown, or the components shown may be multi-layer structures. Such additional layers may or may not superpose both the electrochemically active region and the sealing region. The separator plates may have optionally have raised sealing ridges projecting from the major surfaces thereof in the sealing region. In a fuel cell assembly under compression, the sealing ridges will compress the fluid distribution layer.

Those in the art will appreciate that the general principles disclosed in the preceding can be expected to apply to both gas and liquid feed fuel cells, e.g. gaseous hydrogen/air solid polymer fuel cells and liquid methanol/air or "direct methanol" solid polymer fuel cells. However, it is expected that fewer polymers will be suitable for use in the latter since a suitable polymer would have to be compatible with liquid methanol.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A fuel cell comprising:
   (a) a pair of substantially fluid impermeable separator plates;
   (b) a pair of fluid distribution layers interposed between said separator plates, each of said fluid distribution layers having two major planar surfaces, at least one of said fluid distribution layers comprising a sealing region and an electrically conductive, fluid permeable active region, said at least one fluid distribution layer comprising thermoplastic polymeric material extending into each of said sealing region and said active region;
   (c) an ion exchange membrane interposed between at least a portion of said fluid distribution layers;
   (d) a quantity of electrocatalyst interposed between at least a portion of each of said fluid distribution layers and at least a portion of said membrane, thereby defining said active region;
   wherein said thermoplastic polymeric material is melt-bonded within said material in said sealing region, thereby rendering said at least one fluid distribution layer substantially fluid impermeable in a direction parallel to said major planar surfaces, in said sealing region.

2. The fuel cell of claim 1 wherein said thermoplastic polymeric material comprises a preformed sheet.

3. The fuel cell of claim 2 wherein said preformed sheet is a mesh.

4. The fuel cell of claim 2 wherein said preformed sheet is microporous.

5. The fuel cell of claim 1 wherein said thermoplastic polymeric material comprises particulates dispersed throughout said fluid distribution layer.

6. The fuel cell of claim 5 wherein said particulates are fibers.

7. The fuel cell of claim 1 wherein said thermoplastic polymeric material comprises a polyolefin.

8. The fuel cell of claim 1 wherein said polyolefin is selected from the group consisting of polyethylene and polypropylene.

9. The fuel cell of claim 1 wherein said ion exchange membrane superposes at least a portion of said sealing region.

10. The fuel cell of claim 9 wherein said thermoplastic polymeric material is also melt-bonded to said ion exchange membrane.

11. The fuel cell of claim 1 wherein both fluid distribution layers of said pair comprises a sealing region and an electrically conductive, fluid permeable active region, and both fluid distribution layers comprise thermoplastic polymeric material extending into each of said sealing region and said active region.

12. The fuel cell of claim 1 wherein said fluid distribution layer comprises an electrically conductive filler at least in said active region.

13. The fuel cell of claim 1 wherein said at least one fluid distribution layer further comprises at least one channel for directing a fluid reactant stream, said at least one channel formed in at least one of said major planar surfaces thereof, said at least one channel traversing said active region.

14. The fuel cell of claim 1 wherein at least one of said separator layers comprises at least one channel formed in a major surface thereof facing said at least one fluid distribution layer, said at least one channel directing a fluid reactant stream in contact with said layer.

15. A method of sealing at least one of a pair of fluid distribution layers in a fuel cell, said fuel cell comprising:
   (a) a pair of substantially fluid impermeable separator plates;
   (b) said pair of fluid distribution layers interposed between said separator plates, each of said fluid distribution layers having two major planar surfaces, said at least one fluid distribution layer comprising a sealing region and an electrically conductive, fluid permeable active region, said at least one fluid distribution layer comprising thermoplastic polymeric material extending into each of said sealing region and said active region;
   (c) an ion exchange membrane interposed between at least a portion of said fluid distribution layers;
   (d) a quantity of electrocatalyst interposed between at least a portion of each of said fluid distribution layers and at least a portion of said membrane, thereby defining said active region;
   said method comprising melt-bonding said thermoplastic polymeric material within said material in said sealing region, thereby rendering said at least one fluid distribution layer substantially fluid impermeable in a direction parallel to said major planar surfaces, in said sealing region.

16. The method of claim 15 wherein said thermoplastic polymeric material comprises a preformed sheet.

17. The method of claim 16 wherein said preformed sheet is a mesh.

18. The method of claim 16 wherein said preformed sheet is microporous.

19. The method of claim 15 wherein said thermoplastic polymeric material comprises particulates dispersed throughout said fluid distribution layer.

20. The method of claim 19 wherein said particulates are fibers.

21. The method of claim 15 wherein said thermoplastic polymeric material comprises a polyolefin.

22. The method of claim 15 wherein said polyolefin is selected from the group consisting of polyethylene and polypropylene.

23. The method of claim 15 wherein said ion exchange membrane superposes at least a portion of said sealing region.

24. The method of claim 23 additionally comprising melt-bonding said thermoplastic polymeric material to said ion exchange membrane.

25. The method of claim 15 wherein both fluid distribution layers of said pair comprises a sealing region and an electrically conductive, fluid permeable active region, and both fluid distribution layers comprise thermoplastic polymeric material extending into each of said sealing region and said active region.

26. The method of claim 15 wherein said fluid distribution layer comprises an electrically conductive filler at least in said active region.

27. The method of claim 15 wherein said at least one fluid distribution layer further comprises at least one channel for directing a fluid reactant stream, said at least one channel formed in at least one of said major planar surfaces, said at least one channel traversing said active region.

28. The method of claim 15 wherein at least one of said separator layers comprises at least one channel formed in a major surface thereof facing said at least one fluid distribution layer, said at least one channel directing a fluid reactant stream in contact with said layer.

* * * * *